3,019,445
FASTENING DEVICE AND MANNER OF ATTACHING THE SAME
Julius A. Hirsch and Lillian Small, Chicago, Ill., assignors to Cutter Cravat, Inc., Chicago, Ill., a corporation of Illinois
Filed Aug. 13, 1957, Ser. No. 677,981
8 Claims. (Cl. 2—145)

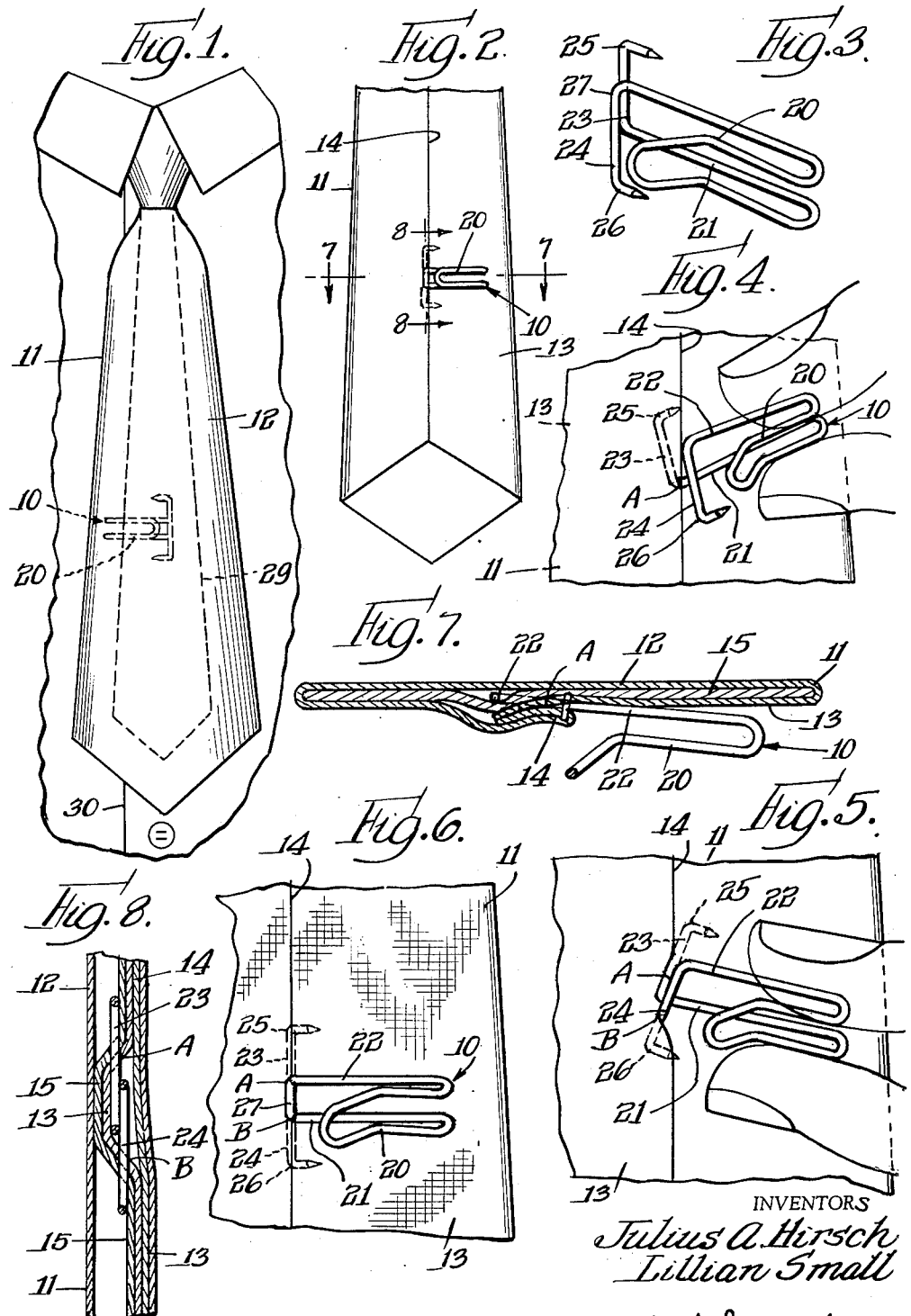

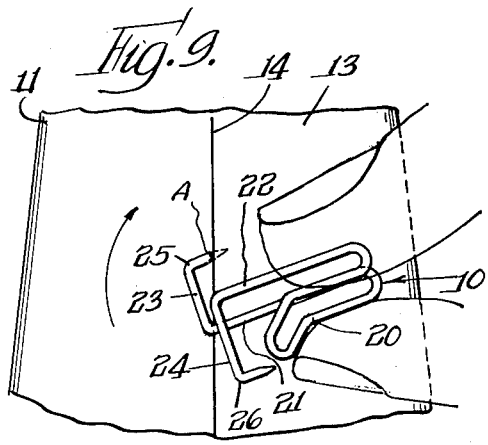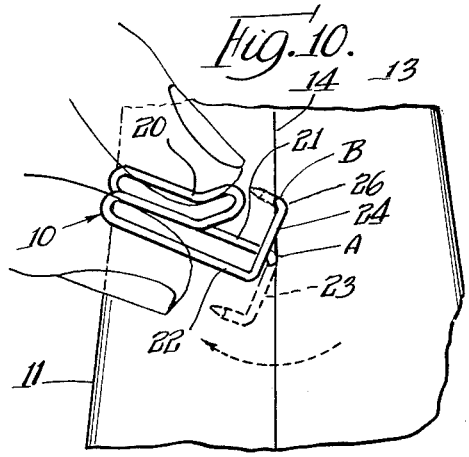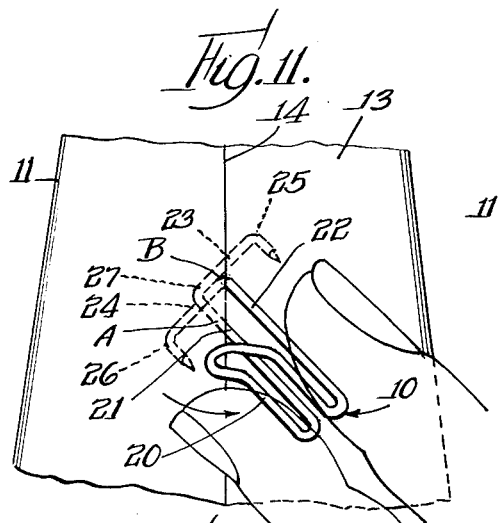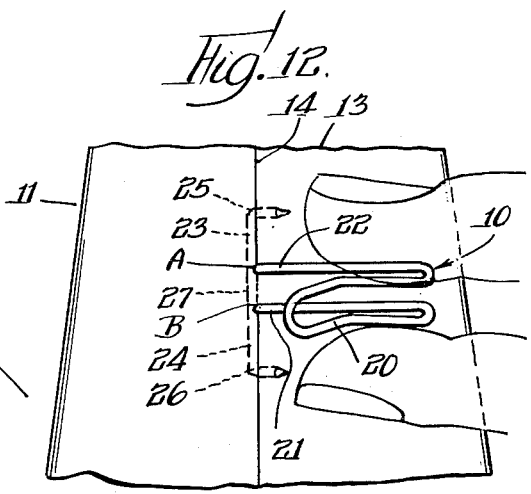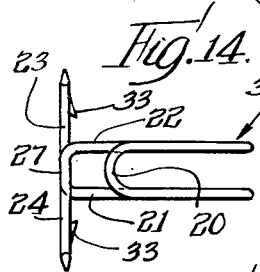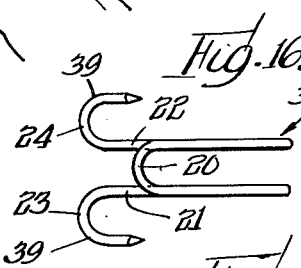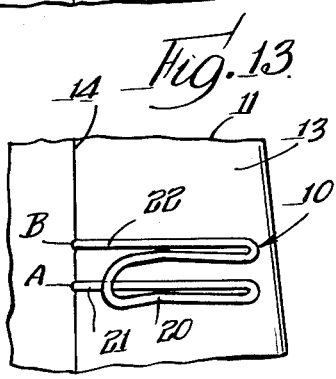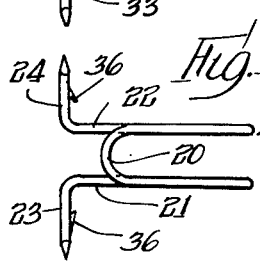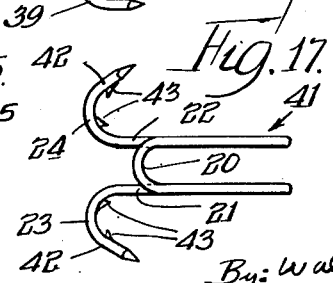

This invention is directed to a fastening device and the manner of attaching the same. The fastening device of this invention may take many different forms, having various kinds of body portions, such as clips, eyes, hooks, buttons and the like, which may be used for fastening purposes. The fastening device of this invention has particular utility as a fastening clip, such as a necktie clip for attachment to the fabric on the rear side of the front portion of a necktie, and it is so illustrated herein.

The principal object of this invention is to provide an improved fastening device, such as a necktie clip or the like, and an improved manner of attaching the same to a fabric, such as the fabric on the rear side of the front portion of a necktie. Briefly, the fastening device of this invention includes a body portion, such as a clip portion formed of wire, and a pair of spaced apart substantially parallel wire legs extending therefrom which outwardly terminate in oppositely extending pointed prongs which pierce and extend through the fabric to which the fastening device is thereby attached. First one pointed prong is inserted into the fabric and then the other by suitable manipulation of the fastening device. Accordingly, the fastening device is firmly attached to the fabric in a simple and inexpensive manner, requiring only certain manipulation of the fastening device which is readily accomplished, and not requiring additional equipment and time consuming operations as are required where a fastening device is attached to a fabric as by pinning, sewing, stapling, riveting, clenching, adhesion, or the like.

The oppositely extending pointed prongs on the substantially parallel legs may be so arranged as to partially overlap each other to facilitate, and provide additional manners of, attaching the fastening device to the fabric, and said oppositely extending pointed prongs may also be provided with reverse bends to facilitate attachment and to provide a more firm attachment. The oppositely extending pointed prongs in some instances may also be provided with barbs to assure firm attachment.

Further objects of this invention reside in the details of construction of the fastening device, in the cooperative relationships between the component parts thereof and in the manner of attaching the same to a fabric, and more particularly to the construction of a necktie clip, its association with the fabric on the rear side of the front portion of a necktie and the manner of attaching it thereto.

Other objects and advantages of this invention will become apparent to those skilled in the art upon reference to the accompanying specification, claims and drawings in which:

FIG. 1 is a front elevational view of a tied necktie with the fastening device of this invention, in the form of a necktie clip, attached to the rear side of the front portion of the necktie and holding the small or back end portion of the necktie in place and holding the entire necktie in place on the front of the shirt;

FIG. 2 is an elevational view of the rear side of a necktie illustrating the necktie clip of FIG. 1 attached thereto;

FIG. 3 is an enlarged perspective view of one form of the fastening device or necktie clip of this invention;

FIGS. 4, 5 and 6 are elevational views illustrating one manner of attaching the fastening device or necktie clip of FIG. 3 to the rear side of a necktie;

FIG. 7 is an enlarged horizontal sectional view taken substantially along the line 7—7 of FIG. 2;

FIG. 8 is an enlarged vertical sectional view taken substantially along the line 8—8 of FIG. 2;

FIGS. 9, 10, 11, 12 and 13 are elevational views illustrating another manner of attaching the fastening device or necktie clip of FIG. 3 to the rear side of a necktie; and FIGS. 14, 15, 16 and 17 are views illustrating, respectively, different forms of the fastening device or necktie clip.

Referring first to FIGS. 1 to 13, one form of the fastening device of this invention is generally designated at 10 and it is illustrated as a necktie clip which is attached to the rear side of the front or wide portion of a fabric necktie 11. The fabric necktie 11 has a front side 12 and a rear side 13 which is provided with the usual overlapping seam 14, the necktie being provided with a conventional liner 15. The necktie clip 10 is illustrated as being attached to the rear side 13 of the necktie in the seam 14 although it may be attached at any other place on the rear side 13 of the necktie if this be so desired. As illustrated, the necktie clip extends through the liner 15 of the necktie as well as the fabric on the rear side of the necktie. If desired the necktie clip may be extended only through the fabric 13 on the rear side of the necktie, it not being necessary to extend the necktie clip through the liner 15, although this is sometimes preferable.

The fastening device 10 is preferably formed from wire and it includes a body portion which, as illustrated, is in the form of a clip 20. A pair of spaced apart substantially parallel wire legs 21 and 22 extend from the body portion or clip 20 and these wire legs terminate in oppositely extending pointed prongs 23 and 24, respectively. In this form of the invention the pointed prongs 23 and 24 are provided with reverse bends 25 and 26, the prongs being sharply bent at these points as indicated. These pointed prongs 23 and 24 partially overlap each other as indicated at 27. These pointed prongs 23 and 24 pierce and extend through the fabric in the rear side 13 of the necktie for firmly attaching the fastening device or necktie clip 10 thereat to the necktie. The necktie clip is preferably formed from heat treated wire so that it resiliently retains its shape.

One manner of attaching the necktie clip 10 to the fabric on the rear side of the necktie 11 is illustrated in FIGS. 4 to 8. As shown in FIG. 4, the tie clip 10 is arranged in its approximate desired position and the fabric on the rear side of the necktie is pierced by the pointed prong 23 and the pointed prong 23 is extended into the fabric at least up to its associated leg 21, the point of piercing being designated A. As shown in FIG. 5, the fabric of the rear side of the necktie is then pierced by the pointed prong 24 at point B, points A and B being spaced apart an amount substantially equal to the spacing between the parallel wire legs 21 and 22 of the necktie clip. The pointed prong 24 is then extended into the fabric and the necktie clip 10 is centered with respect to points A and B as illustrated in FIG. 6. It is here noted that the overlapping portions 27 of the pointed prongs 23 and 24 are outwardly exposed along with the parallel legs 21 and 22 and the clip portion 20, the remaining portions of the pointed prongs 23 and 24 lying underneath the fabric 13. These overlapping portions 27 of the pointed prongs 23 and 24 and the reverse bends 25 and 26 of those pointed prongs operate effectively to retain the necktie clip 10 in proper position on the necktie 11. As illustrated in FIGS. 7 and 8 the pointed prongs 23 and 24 also extend through the lining 15 of the necktie and that the piercing takes place within the seam 14 of the necktie. By so doing an extremely firm attachment is provided and the attachment is effectively hidden by the seam 14. As expressed above, however, it is not necessary that this be done for the pointed prongs 23 and 24 may pierce only the fabric 13 on the reverse side of the necktie 13 and may so do at points other than in the seam 14 and still attain extremely satisfactory results.

FIGS. 9 to 13 illustrate another manner of attaching the fastening device or necktie clip 10 to the rear side of the necktie 11. As shown in FIG. 9 the necktie clip 10 is arranged in approximately its desired position and the fabric 13 is pierced by the pointed prong 23 at point A. The pointed prong 23 is then extended into the fabric 13 at least up to its associated leg 21 and the necktie clip 10 is rotated through substantially 180 degrees in a clockwise direction as illustrated in FIG. 10. The fabric 13 is then pierced by the pointed prong 24 at the point B, the spacing between the points A and B being substantially equal to the spacing between the parallel legs 21 and 22. The pointed prong 24 is then extended into the fabric 13 at least up to its associated leg 22 and the necktie clip 10 is re-rotated through substantially 180 degrees in the opposite direction toward its original position as illustrated in FIG. 11. When the necktie clip 10 is so rotated to its original position, as illustrated in FIG. 12, the entire pointed prongs 23 and 24 are arranged below the fabric 13 and only the parallel legs 21 and 22 and the clip portion 20 are exposed above the fabric as shown in FIG. 13. Because the entire pointed prongs 23 and 24 are arranged below the fabric 13 an extremely firm attachment is provided and the ultimate appearance of the attachment is pleasing and neat. While FIGS. 9 to 13 illustrate the attachment of the necktie clip 10 in the seam 14 on the rear side 13 of the necktie, this as expressed above, is not necessary, although it is preferable.

Another form of fastening device or necktie clip is generally designated at 32 in FIG. 14 and it includes a clip portion 20 and spaced apart substantially parallel legs 21 and 22 extending therefrom which outwardly terminate in oppositely extending pointed prongs 23 and 24, these pointed prongs overlapping as indicated at 27. However, the pointed prongs 23 and 24 are not provided with reverse bends as in the necktie clip 10 but instead are provided with barbs 33 to assist in retaining the fastening device or necktie clip 32 in place. The manners of attaching the fastening device or necktie clip 32 to the fabric 13 are the same as discussed above in connection with the fastening device or necktie clip 10 and therefore a further description, in this respect, is not necessary. The barbs 33 operate effectively to form an extremely firm attachment.

A further form of fastening device or necktie clip is generally designated at 35 in FIG. 15, this necktie clip including a clip portion 20 and a pair of substantially parallel spaced apart legs 21 and 22 extending therefrom which outwardly terminate in oppositely extending pointed prongs 23 and 24. Here, however, the pointed prongs 23 and 24 are spaced apart and do not overlap as in the case of the necktie clips 10 and 32. The necktie clip 35 is attached to the fabric on the rear side 13 of the necktie in the same manner that the necktie clip 10 is there attached as described above in connection with FIGS. 4, 5 and 6. Because the prongs 23 and 24 are spaced apart and do not overlap the fastening device or necktie clip 35 cannot be attached to the necktie 11 in the manner described above in connection with FIGS. 9 to 13. Here the prongs 23 and 24 are not provided with reverse bends but are provided with barbs 36 to assist in maintaining the necktie clip 35 in place on the necktie.

Still another form of fastening device or necktie clip is generally designated at 38 in FIG. 16 and it also includes a clip portion 20 and a pair of spaced apart substantially parallel legs 21 and 22 extending therefrom which outwardly terminate in oppositely extending pointed prongs 23 and 24. As in the case of the necktie clip 35, the pointed prongs 23 and 24 of the necktie clip 38 are spaced apart and do not overlap. The pointed prongs 23 and 24 of the necktie clip 38 are provided with gradual reverse bends as indicated at 39. The necktie clip 38 is attached in the manner described above in connection with FIGS. 4 to 6 and the reverse bends 39 in the pointed prongs 23 and 24 cooperate with the parallel legs 21 and 22 to maintain the necktie clip 38 in proper position when attached.

Still another form of fastening device or necktie clip is generally designated at 41 in FIG. 17, it including a clip portion 20 and a pair of substantially parallel wire legs 21 and 22 extending therefrom which outwardly terminate in oppositely extending pointed prongs 23 and 24. Here also the pointed prongs 23 and 24 are spaced apart and do not overlap and the necktie clip 41 is attached to the necktie in the manner described above in connection with FIGS. 4, 5 and 6. Here the pointed prongs 23 and 24 are provided with gradual reverse bends 42 which are somewhat different from the reverse bends 39 of the necktie clip 38. In addition the pointed prongs 23 and 24 are provided with barbs 43 to assist in retaining the necktie clip 41 in the fabric of the necktie.

The necktie clips of this invention, which are so attached to the rear side of the front portion of the necktie, are small in size and light in weight and do not in any way interfere with the tying of the necktie. After the necktie is tied, as illustrated in FIG. 1, the narrow or rear end portion 29 of the necktie is inserted in the clip portion 20 to be held in place thereby and then the clip portion is inserted over the edge 30 of the shirt so that the entire necktie is neatly held in place by the invisible necktie clip.

While for purposes of illustration several forms of this invention have been disclosed, other forms thereof may become apparent to those skilled in the art upon reference to this disclosure, and therefore this invention is to be limited only by the scope of the appended claims.

We claim as our invention:

1. In a fastening device having a body portion and a pair of spaced apart substantially parallel wire legs extending therefrom which outwardly terminate in oppositely extending and partially overlapping pointed prongs which lie in the planes of the legs, the method of attaching said device to a fabric comprising the steps of, positioning the fastening device at substantially its desired position with respect to the fabric, piercing the fabric with one of said pointed prongs and extending said pointed prong into said fabric at least up to its associated leg, rotating the position of the fastening device through substantially 180 degrees in one direction, piercing the fabric with the other of said pointed prongs at a point spaced from the point where said one prong pierces the fabric substantially equal to the spacing between the parallel legs of the fastening device and extending said other pointed prong into said fabric at least up to its associated leg, and rerotating the position of the fastening device through substantially 180 degrees in the opposite direction to its original position, whereby the entire pointed prongs are arranged below the fabric and only the body portion and parallel legs are exposed above the fabric.

2. The method of attaching a necktie clip to the fabric on the rear side of the front portion of a fabric necktie wherein the necktie clip comprises a wire formed into a clip portion and having a pair of spaced apart substantially parallel wire legs extending therefrom which outwardly terminate in oppositely extending and partially overlapping pointed prongs which lie in the planes of the legs, comprising the steps of, positioning the necktie clip at substantially its desired position with respect to the fabric on the rear side of the front portion of the necktie, piercing the fabric on the rear side of the front portion of the necktie with one of said pointed prongs and extending said pointed prong into said fabric at least up to its associated leg, rotating the position of the necktie clip through substantially 180 degrees in one direction, piercing the fabric on the rear side of the front portion of the necktie with the other of said pointed prongs at a point spaced from the point where said one prong pierces the fabric substantially equal to the spacing between the parallel legs of the necktie clip and extending said other prong into said fabric at least up to its associated leg, and re-rotating the position of the necktie clip through substantially 180 degrees in the opposite direction to its original position, whereby the entire pointed prongs are arranged below the fabric on the rear side of the front portion of the necktie and only the clip portion or parallel legs of the necktie clip are exposed above said fabric.

3. A fastening device for attachment to a fabric comprising a body portion, a pair of substantially parallel wire legs extending outwardly therefrom, and a pointed prong at the outer end of each leg, said pointed prongs having portions extending substantially laterally from the ends of the legs in opposite directions substantially in the plane of the legs and pointed portions extending inwardly from said laterally extending portions substantially parallel to said legs, said pointed prongs being adapted to pierce and extend through the fabric to which the fastening device is thereby attached.

4. A fastening device for attachment to a fabric comprising a body portion, a pair of substantially parallel wire legs extending outwardly therefrom, and a pointed prong at the outer end of each leg, said pointed prongs having portions partially overlapping each other and extending substantially laterally from the ends of the legs in opposite directions substantially in the plane of the legs and pointed portions extending inwardly from said laterally extending portions substantially parallel to said legs, said pointed prongs being adapted to pierce and extend through the fabric to which the fastening device is thereby attached.

5. A fastening clip for attachment to a fabric comprising a wire formed into a clip portion, a pair of substantially parallel wire legs extending outwardly therefrom, and a pointed prong at the outer end of each leg, said pointed prongs having portions extending substantially laterally from the ends of the legs in opposite directions substantially in the plane of the legs and pointed portions extending inwardly from said laterally extending portions substantially parallel to said legs, said pointed prongs being adapted to pierce and extend through the fabric to which the fastening clip is thereby attached.

6. A fastening clip for attachment to a fabric comprising a wire formed into a clip portion, a pair of substantially parallel wire legs extending outwardly therefrom, and a pointed prong at the outer end of each leg, said pointed prongs having portions partially overlapping each other and extending substantially laterally from the ends of the legs in opposite directions substantially in the plane of the legs and pointed portions extending inwardly from said laterally extending portions substantially parallel to said legs, said pointed prongs being adapted to pierce and extend through the fabric to which the fastening clip is thereby attached.

7. In combination, a fabric necktie having a rear portion and a front portion, a necktie clip comprising a wire formed into a clip portion, a pair of substantially parallel wire legs extending outwardly therefrom, and a pointed prong at the outer end of each leg, said pointed prongs having portions extending substantially laterally from the ends of the legs in opposite directions substantially in the plane of the legs and pointed portions extending inwardly from said laterally extending portions substantially parallel to said legs, said pointed prongs piercing and extending through the fabric in the rear side of the front portion of the necktie for attaching the necktie clip solely thereby to the rear side of the front portion of the necktie, and said clip portion being adapted to receive the rear portion of the necktie.

8. In combination, a fabric necktie having a rear portion and a front portion provided with a seam on the rear side thereof, a necktie clip comprising a wire formed into a clip portion, a pair of substantially parallel wire legs extending outwardly therefrom, and a pointed prong at the outer end of each leg, said pointed prongs having portions extending substantially laterally from the ends of the legs in opposite directions substantially in the plane of the legs and pointed portions extending inwardly from said laterally extending portions substantially parallel to said legs, said pointed prongs piercing and extending through the fabric in the seam in the rear side of the front portion of the necktie for attaching the necktie clip solely thereby to the rear side of the front portion of the necktie, and said clip portion being adapted to receive the rear portion of the necktie.

References Cited in the file of this patent
UNITED STATES PATENTS

| | | |
|---|---|---|
| 216,383 | Doring | June 10, 1879 |
| 281,703 | Ladd | July 24, 1883 |
| 334,391 | Kohler | Jan. 12, 1886 |
| 574,008 | Sevigne | Dec. 29, 1896 |
| 621,859 | Seymour | Mar. 28, 1899 |
| 788,338 | Smith | Apr. 25, 1905 |
| 1,573,885 | Weisbaum | Feb. 23, 1926 |
| 1,644,863 | Weisbaum | Oct. 11, 1927 |
| 2,013,061 | Loewinsohn | Sept. 3, 1935 |
| 2,449,045 | Athans | Sept. 14, 1948 |